US010111162B2

(12) United States Patent
Chen et al.

(10) Patent No.: US 10,111,162 B2
(45) Date of Patent: Oct. 23, 2018

(54) METHOD OF CONTROLLING NETWORK TRAFFIC FOR USER EQUIPMENT AND BASE STATION AND RELATED APPARATUSES USING THE SAME

(71) Applicant: Acer Incorporated, New Taipei (TW)

(72) Inventors: Hung-Chen Chen, New Taipei (TW); Ching-Wen Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 72 days.

(21) Appl. No.: 14/934,167

(22) Filed: Nov. 6, 2015

(65) Prior Publication Data

US 2016/0142970 A1 May 19, 2016

Related U.S. Application Data

(60) Provisional application No. 62/079,561, filed on Nov. 14, 2014.

(51) Int. Cl.
*H04W 4/00* (2018.01)
*H04W 48/18* (2009.01)
(Continued)

(52) U.S. Cl.
CPC ............ *H04W 48/18* (2013.01); *H04L 47/14* (2013.01); *H04W 28/08* (2013.01); *H04W 76/14* (2018.02);
(Continued)

(58) Field of Classification Search
CPC ... H04W 48/18; H04W 28/08; H04W 76/023; H04W 76/025; H04W 88/06; H04L 47/14
(Continued)

(56) References Cited

U.S. PATENT DOCUMENTS 7,693,093 B2 * 4/2010 Riedel .................. H04W 36/26
370/260
2012/0172036 A1 * 7/2012 Bhalla ............... H04W 36/0033
455/432.1
(Continued)

FOREIGN PATENT DOCUMENTS

CN 102307375 1/2012
CN 103109564 5/2013
(Continued)

OTHER PUBLICATIONS

NSN, "Introduction of MeNB initiated SeNB Modification for Dual Connectivity," 3GPP TSG-RAN WG3 Meeting#84, May 2014, pp. 1-9.
(Continued)

*Primary Examiner* — Sai Ming Chan
(74) *Attorney, Agent, or Firm* — JCIPRNET

(57) ABSTRACT

The present disclosure is directed to a method of controlling network traffic for a user equipment (UE) and a base station (BS). In one of the exemplary embodiments, the disclosure is directed to a method of controlling network traffic for a UE. The method would include not limited to determining whether to select a target access network, and transmitting a traffic re-direct inform message in response to the selection of the target access network, wherein the traffic re-direct inform message comprises information of the target access network and a traffic flow indicator corresponding to at least one traffic flow.

27 Claims, 12 Drawing Sheets

(51) Int. Cl.
*H04L 12/801* (2013.01)
*H04W 76/14* (2018.01)
*H04W 76/15* (2018.01)
*H04W 88/06* (2009.01)
*H04W 28/08* (2009.01)
*H04W 92/20* (2009.01)

(52) U.S. Cl.
CPC ........... *H04W 76/15* (2018.02); *H04W 88/06* (2013.01); *H04W 92/20* (2013.01)

(58) Field of Classification Search
USPC ........................................................ 370/328
See application file for complete search history.

(56) References Cited

U.S. PATENT DOCUMENTS

| 2013/0150051 | A1* | 6/2013 | Van Phan | ............. | H04W 12/04 |
| | | | | | 455/437 |
| 2014/0082697 | A1 | 3/2014 | Watfa et al. | | |
| 2014/0211626 | A1 | 7/2014 | Liu | | |
| 2016/0029282 | A1* | 1/2016 | Lee | ....................... | H04W 36/14 |
| | | | | | 370/332 |
| 2016/0135100 | A1* | 5/2016 | Teyeb | ............... | H04W 36/0055 |
| | | | | | 370/331 |

FOREIGN PATENT DOCUMENTS

| WO | 2014112803 | 7/2014 |
| WO | 2014168427 | 10/2014 |

OTHER PUBLICATIONS

3GPP, "Technical Specification Group Radio Access Network; Study om WLAN/3GPP radio interworking," 3GPP TR 37.834 v2.0.0, Nov. 2013, pp. 1-19.

3GPP, "Introduction of MeNB initiated SeNB Modification for Dual Connectivity", 3GPP TSG-RAN WG3 Meeting #84, May 2014, pp. 1-9.

\* cited by examiner

METHOD OF CONTROLLING NETWORK TRAFFIC FOR USER EQUIPMENT AND BASE STATION AND RELATED APPARATUSES USING THE SAME

CROSS REFERENCE TO RELATED APPLICATION

This application claims the priority benefit of U.S. provisional application Ser. No. 62/079,561, filed on Nov. 14, 2014. The entirety of the above-mentioned patent application is hereby incorporated by reference herein and made a part of specification.

BACKGROUND OF THE DISCLOSURE

1. Field of the Disclosure

The present disclosure generally relates to a method of controlling network traffic for a user equipment (UE) and a base station (BS) and related apparatuses using the same.

2. Description of Related Art

The explosive growth of mobile broadband related services have driven and expedited the deployment of the Third Generation Partnership Project (3GPP) networks and non-3GPP networks. The global mobile network subscriptions and the global mobile data traffic have been growing exponentially in the last few years. To support the exponentially growing mobile data traffic, traffic offloading with other access network or other access node becomes a popular topic which researchers focus on. For example, a UE is allowed to steer traffic flow(s) to Wireless Local Access Network (WLAN) based on 3GPP/WiFi interworking mechanisms (i.e., Access Network Discovery and Selection (ANDSF)/Radio Access Network (RAN)-based on 3GPP/WiFi interworking). In addition, according to the 3GPP Release 12, a Master Evolved Node B (MeNB) is able to steer traffic flow(s) to another assisted eNB (i.e., Secondary eNB (SeNB)) based on Dual Connectivity (DC) mechanism.

However, although the purpose of the DC and the 3GPP/WiFi interworking is to offload traffic flow(s), the integration of the two mechanisms has not been resolved. For example, the difference between two mechanisms is, controlling of network traffic is decided by MeNB in release-12 DC mechanism but by UE in release-12 3GPP/WiFi interworking.

Due to the absence of the integration, the offloaded traffic flow(s) of the serving assisted access node (i.e., an SeNB or a WiFi Access Point (AP)) might not directly steer to another available assisted access node and result in bad user experience (e.g., traffic flow dropped or longer latency) and redundant Core Network (CN) overhead since the decision of releasing the serving assisted access node is decided by one mechanism and the decision of adding the available assisted access node is decided by the other one.

FIG. 1A-FIG. 1D are examples of controlling network traffic with different mechanisms. Referring to FIG. 1A, a UE is first camped on the serving eNB (i.e., 3GPP MeNB in the FIG. 1A) and two on-going traffic flows 101 and 102 are established via the MeNB to the 3GPP core network. After camped on the serving eNB, the UE may receive RAN assistance information (including parameters and values for the operation of 3GPP/WiFi interworking) from the serving eNB for the 3GPP/WiFi interworking mechanism. The UE may apply the configuration from the core network and the RAN assistance information from the serving eNB to the selection of non-3GPP access network, and the controlling of network traffic or routing of traffic flows.

Referring to FIG. 1B, the UE is moving into the coverage of the WiFi AP. The UE selects the WLAN of the WiFi AP and decides to steer traffic to the WLAN of the WiFi AP based on the 3GPP/WiFi interworking mechanism (with the received rules). In this case, the UE decides to steer one of the two traffic flows 101 and 102 (i.e., traffic flow 102) to the WLAN of the WiFi AP. And afterwards, the UE establishes two new traffic flows 103 and 104 via the WiFi AP to the 3GPP core network.

Referring to FIG. 1C, the UE is leaving the coverage of the WiFi AP and entering the coverage of a small eNB (i.e., SeNB). To comply with the state of the art of 3GPP Release 12 standard specifications, the UE would first decide to steer the traffic flows 102~104 over WLAN back to the MeNB according to the change of signaling condition when leaving the coverage of the WiFi AP. After the success of traffic controlling of network from WLAN to MeNB, MeNB decides to steer traffic flows 102~104 to an reachable small eNB when the MeNB find that the UE enters the coverage of a small eNB (according to the measure reports by the UE, operator policy and the DC capability of the UE, the MeNB, and the neighbor eNBs).

Referring to FIG. 1D, the MeNB steers three traffic flows 102~104 to SeNB by performing the DC procedure. However, risk may happen if the UE trying to steer traffic flows 102~104 from WLAN to the MeNB as shown in FIG. 1C. As shown in FIG. 1C, there would be a risk that some or all of the traffic flows 102~104 traffic controlling back from WLAN to the MeNB may be dropped due to the resource limitation of the MeNB. From another angle, even though the MeNB is capable to take over all the traffic flows 102~104 steered from WLAN, at first, the entire system would need to perform a path update procedure to steer traffic flows 102~104 from WLAN to MeNB, then another path update procedure would be required to steer the traffic flows 102~104 from MeNB to the SeNB. The aforementioned situation may be resulted in one of problems of the entire system. In addition, it would cause a negative impact to the user experience. Therefore, methods and mechanisms to directly steer traffic flows from one assisted access node to another assisted access node is necessary and beneficial.

SUMMARY OF THE DISCLOSURE

Accordingly, the present disclosure is directed to a method of controlling network traffic for a user equipment (UE) and a base station (BS).

In one of the exemplary embodiments, the disclosure is directed to a method of controlling network traffic for a UE. The method would include not limited to determining whether to select a target access network, and transmitting a traffic re-direct inform message in response to determining to select the target access network, wherein the traffic re-direct inform message comprises information of the target access network and a traffic flow indicator corresponding to at least one traffic flow.

In one of the exemplary embodiments, the disclosure is directed to a method of controlling network traffic for a BS. The method would include not limited to receiving a traffic controlling message, wherein the traffic controlling message comprises information of a target access network and a traffic flow indicator corresponding to at least one traffic flow, and requesting for controlling the traffic flow to the target access network in response to receiving the traffic controlling message.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
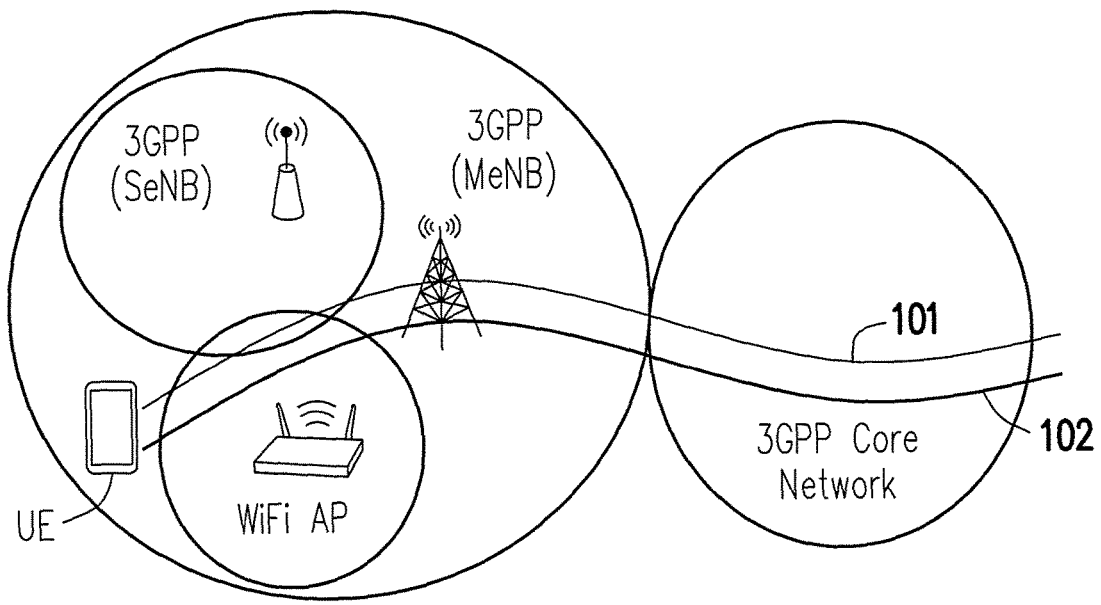
FIG. 1A~FIG. 1D are examples of controlling network traffic with different mechanisms.
Figure 1B:
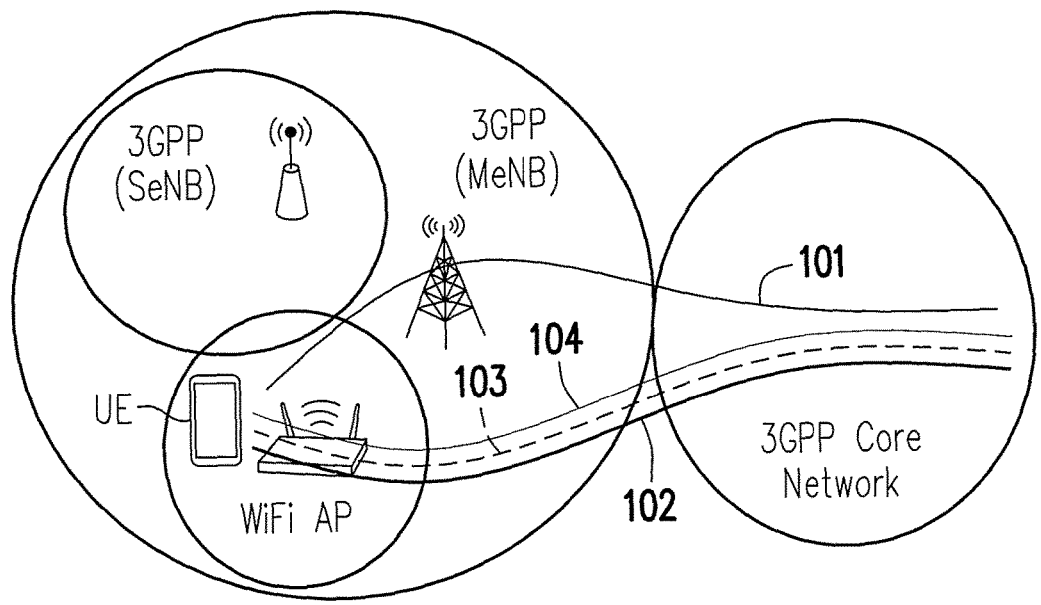
Figure 1C:
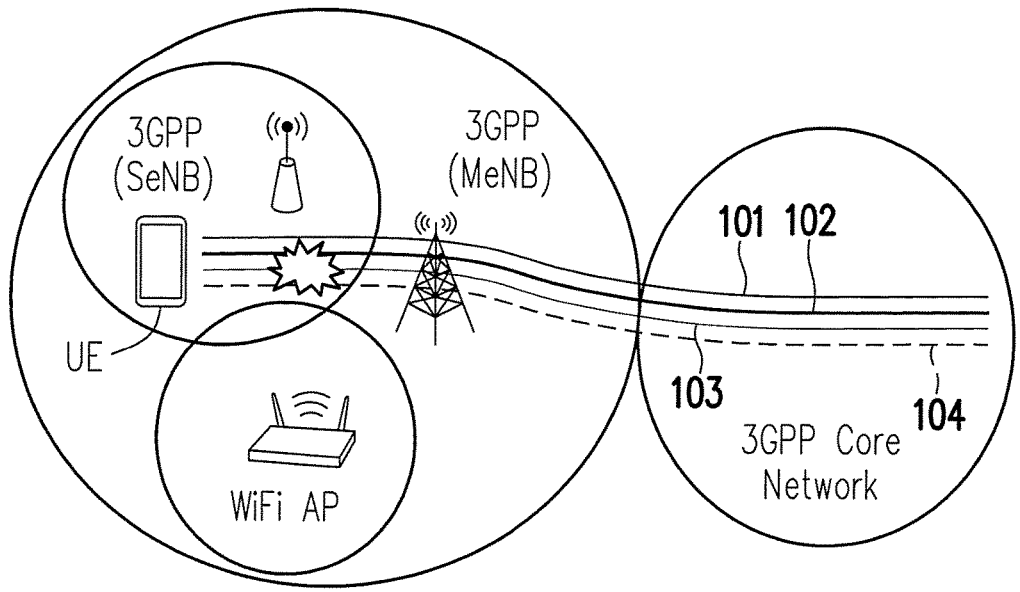
Figure 1D:
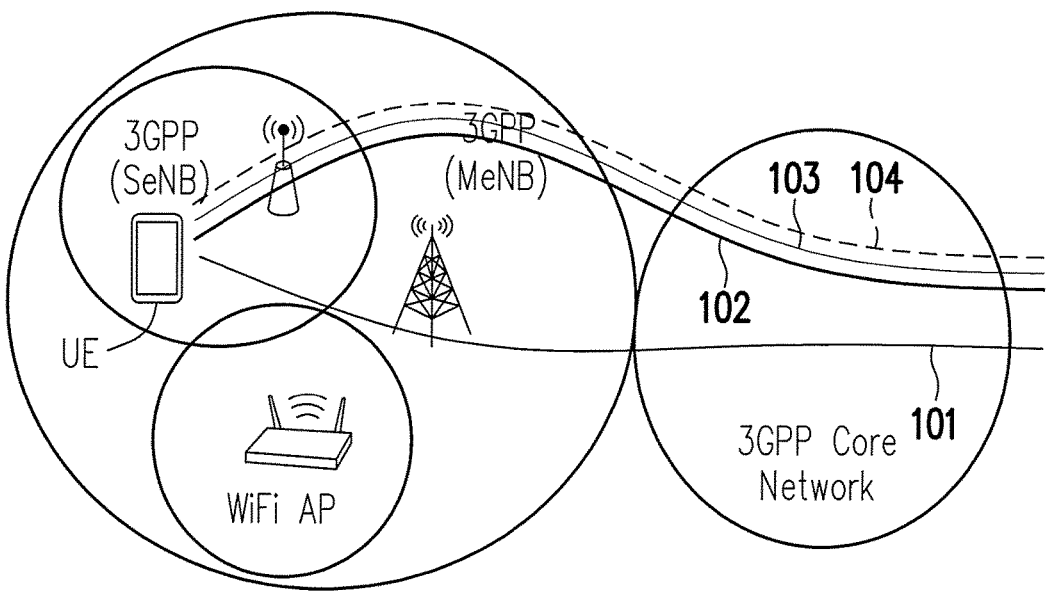

Reference will now be made in detail to the present preferred embodiments of the disclosure, examples of which are illustrated in the accompanying drawings. Wherever possible, the same reference numbers are used in the drawings and the description to refer to the same or like parts.

Due to difficult situation between two assisted access nodes (such as an SeNB and a WiFi AP) for controlling network traffic flows with two mechanisms such as the DC and the 3GPP/WiFi interworking mechanisms, a method or a mechanism would need to be provided, to directly steer traffic flows from one assisted access node to another assisted access node. The present disclosure would provide a traffic controlling solution to prevent service interruption when mobile users are moving among multiple assisted access nodes. Controlling network offloaded traffic between assisted access nodes would not need to be routing back to MeNB of 3GPP access network such as Long Term Evolution (LTE) network. In addition, exemplary embodiments of the present disclosure would support the cooperation of DC and 3GPP/WiFi interworking in the following cases, which are controlling network traffic from SeNB to WLAN, controlling network traffic from WLAN to SeNB, and controlling network traffic from WLAN to WLAN.

In at least one of the exemplary embodiments of the present disclosure, UE would inform MeNB that specific traffic flow(s) to be steered to a target assisted access node. In the case of controlling network traffic from WLAN to SeNB, MeNB may request an assisted access node (i.e., SeNB) to provide radio resource for the UE. In the case of controlling network traffic from SeNB to WLAN, MeNB may request an assisted access node (i.e., SeNB) to release radio resource for the UE. In addition, In the case of controlling network traffic from WLAN to WLAN or WLAN to SeNB, MeNB may request Packet Data Network Gateway (P-GW) to perform controlling network of traffic flow(s). P-GW may postpone the release of packet data network (PDN) connections over assisted access node of a UE if the UE has at least one active PDN connection established via 3GPP network. P-GW may also inform MeNB that traffic flow(s) over WLAN are updated. In the following description, it will be apparent to those skilled in the art that adjustments and applications can be correspondingly made to the following embodiments based on demands instead of being limited by the content in the following description.

Figure 2:
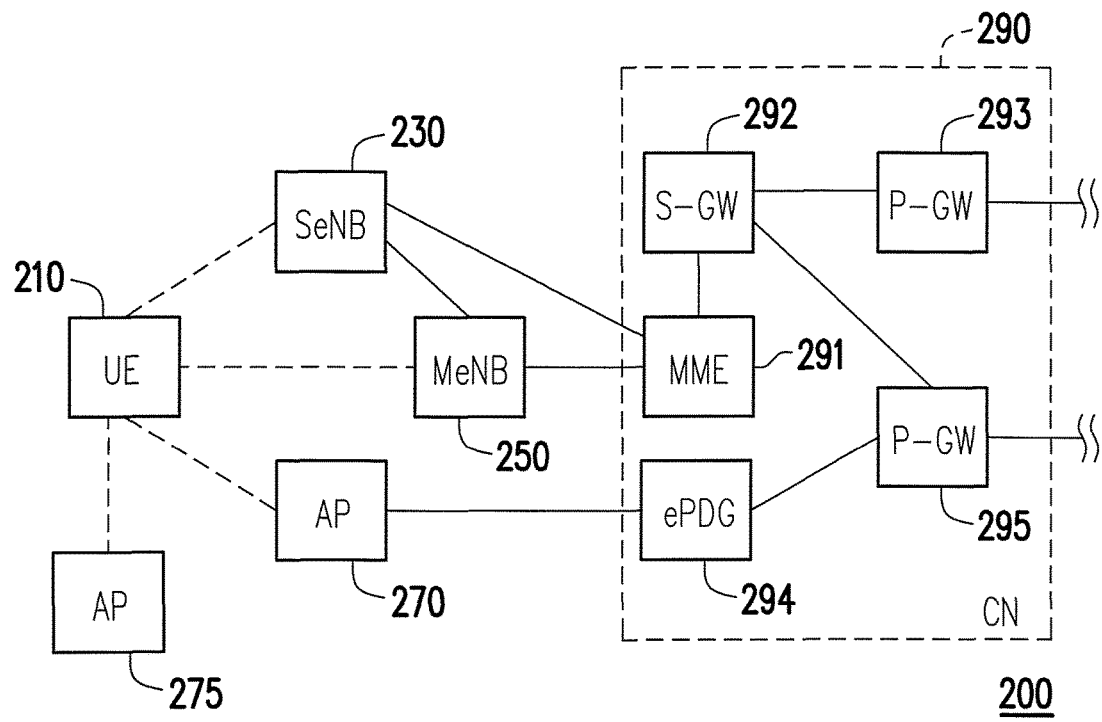
FIG. 2 is a schematic diagram illustrating a communication system in accordance with an embodiment of the present disclosure.

FIG. 2 is a schematic diagram illustrating a communication system in accordance with an embodiment of the present disclosure. Referring to FIG. 2, the communication system 200 could include but not limited to UE 210, SeNB 230, MeNB 250, WiFi APs 270 and 275, and Core Network (CN) 290. It should be noticed that eNBs involved in DC for a certain UE such as UE 210 may assume two different roles: an eNB may either act as an MeNB such as MeNB 250 or as an SeNB such as SeNB 230. In DC, UE 210 is connected to one MeNB 250 and one SeNB 230. In the embodiment, UE 210 is camped on a serving eNB (i.e., MeNB 250). In addition, UE 210 may move into coverage of SeNB 230, AP 270, or AP 275, to be served by SeNB 230, AP 270, or AP 275.

The CN 290 may contain at least but not limited to a mobility management entity (MME) 291, a Serving Gateway (S-GW) 292, a Packet Data Network Gateway (P-GW) 293 for 3GPP access network, an Evolved Packet Data Gateway (ePDG) 294, and a P-GW 295 for non-3GPP access network. The MME 251 is connected with the SeNB 230, the MeNB 250, and the S-GW 292. The S-GW 292 is connected with the MME 291, the P-GWs 293 and 295. The ePDG 294 is connected with the AP 270 and the P-GW 295.

Figure 3:
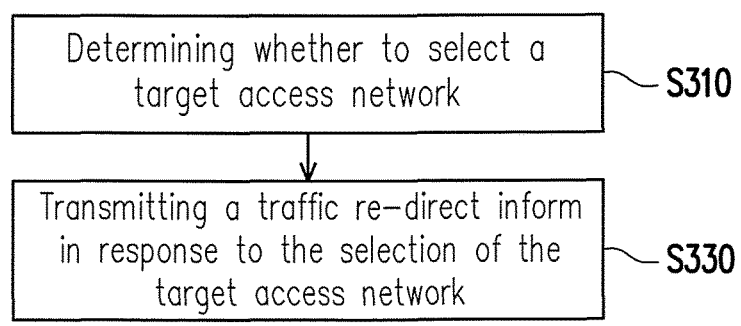
FIG. 3 is a flow chart illustrating method of controlling network traffic for a UE in accordance with an embodiment of the present disclosure.

FIG. 3 is a flow chart illustrating method of controlling network traffic for a UE such as UE 210 in accordance with an embodiment of the present disclosure. In step S310, UE 210 may determine whether to select a target access network. Specifically, UE 210 may monitor signal quality (such as signal-to-noise ratio (SNR)) or signal strengths (such as signal strength such as received signal code power (RSCP) or Received Signal Strength Indication (RSSI)) of received signals from its supported access networks including 3GPP and non-3GPP access networks. The signal quality or the signal strengths of received signals may change when UE 210 is moving. At least one criterion of determining signal quality or signal strengths of received signals would be used by the UE 210. For example, a criterion is made by determining an access network which has the largest signal strength of received signal. The criterion may be provided in RAN assistance information. The target access network may be a 3GPP access network such as an access network of SeNB 230 or a non-3GPP access network such as AP 270 or 275. In should be noticed that, the embodiment of the present disclosure is not limited by the aforementioned signal quality or signal strength criterion, UE 210 may also select another access network in response to receiving an operation of user or a specific trigger signal. In an embodiment of the present disclosure, according to the type of the target access network such as non-3GPP access network, UE 210 may establish at least one PDN connection to a network entity such as the P-GW to serve the UE via the non-3GPP access network. The P-GW such as P-GW 295 for PDN connections over non-3GPP access network of UE 210 may create a context of UE 210. If the target P-GW such as P-GW 295 is different from the original P-GW such as 293, these P-GWs may be informed that UE 210 has active PDN connection over 3GPP and non-3GPP access networks simultaneously.

In step S330, UE 210 may transmit a traffic re-direct inform message in response to the selection of the target access network, where the traffic re-direct inform message comprises information of the target access network and a traffic flow indicator corresponding to at least one traffic flow. In this embodiment, the traffic flow indicator comprises at least one traffic flow identifier (ID), and UE 210 may determine the traffic flow to be steered to the target access network, where each traffic flow is corresponding to one of the traffic flow ID. The information of the target access network maybe be but not limited to information of Access Point Name (APN), a AP ID such as a Service Set Identifier (SSID) or any ID of the target access network which may be identified by the MeNB 250 and/or network entities in CN 290. In addition, the traffic re-direct inform message further comprises a multi-connection indicator. The multi-connection indicator indicates UE 210 support packet data network (PDN) connections over 3GPP and non-3GPP access networks simultaneously.

Then, in response to selecting the target access network, UE 210 may generate a traffic re-direct inform message comprising aforementioned parameters (i.e., information of the target access network, traffic flow IDs, and multi-connection indicator). The traffic re-direct inform message would be transmitted to the MeNB 250 or any other serving eNB over the 3GPP access network. It should be noticed that, before UE 210 transmits the traffic re-direct inform message to the serving eNB, UE 210 may establish at least one PDN connection to a network entity such as P-GW 293. In some embodiments of the present disclosure, UE 210 may have active PDN connection over 3GPP and non-3GPP access networks simultaneously.

After transmitting the traffic re-direct inform message, UE 210 may establish a connection over the target access network for continuing a transmission of the traffic flow. In some embodiments of the present disclosure, according to the type (i.e., the 3GPP or the non-3GPP access network) of the target access network, MeNB 250 may request the target access network and the original access network to provide, modify, or release radio resource of the 3GPP access network for UE 210. In an embodiment of the present disclosure in which the target access network is the 3GPP access network such as the network of SeNB 230, SeNB 230 and MeNB 250 may perform a SCG addition procedure to provide radio resource for UE 210. In an embodiment of the present disclosure in which the target access network is the non-3GPP access network such as the network of AP 270 or 275, SeNB 230 and MeNB 250 may perform a SeNB modification procedure or a SeNB release procedure to modify or release radio resource for UE 210. Then, UE 210 and MeNB 250 may perform a Radio Resource Control (RRC) reconfiguration procedure. In another embodiment of the present disclosure in which the target access network is the non-3GPP access network such as the WLAN of AP 270 or 275, UE 210 and AP 270 or 275 may perform authentication and PDN connection establishment over the non-3GPP access network. After UE 210 establishes PDN connection(s) with the target access network, the traffic flow which assigned by UE 210 to be steered would be continued to be transmitted over the target access network.

In some embodiments of the present disclosure, UE 210 may further receive radio access network (RAN) assistance information from MeNB 250, to perform 3GPP/WiFi interworking operation. In still another embodiment of the present disclosure, UE 210 may select the target access network according to the RAN assistance information.

Figure 4:
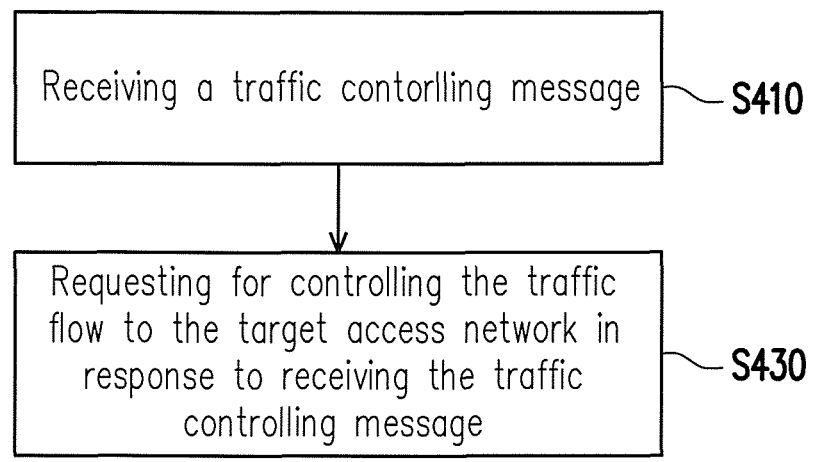
FIG. 4 is a flow chart illustrating method of controlling network traffic for a serving eNB in accordance with an embodiment of the present disclosure.

According to the aforementioned embodiments, MeNE 250 also plays an important role for controlling network traffic. The following description to be introduced is how a serving eNB of UE 210 manages cooperation between different assisted access nodes and UE 210 to steer traffic flow(s). FIG. 4 is a flow chart illustrating method of controlling network traffic for a serving eNB such as MeNE 250 in accordance with an embodiment of the present disclosure. The embodiments may comprise controlling network traffic from WLAN to SeNB, from SeNB to WLAN, and from WLAN to WLAN. In step S410, MeNE 250 may receive a traffic controlling message, where the traffic controlling message comprises information of a target access network and a traffic flow indicator corresponding to at least one traffic flow.

In an embodiment of the present disclosure, the traffic controlling message is a traffic re-direct inform message, and MeNE 250 may receive the traffic re-direct inform message from UE 210 over a Uu interface (in the case of controlling network traffic from WLAN to SeNB, from SeNB to WLAN, and from WLAN to WLAN). The traffic re-direct inform message may be referred to the description of the traffic re-direct inform message in the step 320, and therefore detailed descriptions will not be repeated.

In another embodiment of the present disclosure, the traffic controlling message is a traffic steering indication message, and MeNB 250 may receive the traffic steering indication message from a network entity such as P-GW 293 via MEE 291 (in the case of controlling network traffic from SeNB to WLAN). The traffic steering indication message may comprise at least but not limited to information of a target access network and a traffic flow indicator corresponding to traffic flow to be steered. The information of the target access network may be, for example, a Target AP ID and an APN. The traffic flow indicator comprises at least one traffic flow ID corresponding to the traffic flow to be steered. The traffic steering indication message may further comprise the multi-connection indicator as described in the step S330. A transmission of the traffic steering indication message is initiated by a P-GW such as P-GW 293. After MME 291 receives the traffic steering indication message, the traffic steering indication message would be forwarded to a serving eNB of UE 210 such as MeNB 250.

Then, in step S430, MeNB 250 may request for controlling the traffic flow to the target access network in response to receiving the traffic controlling message. Specifically, in response to receiving the traffic controlling message, MeNB 250 may update information of the traffic flow of UE 210. The information of the traffic flow may be, for example, active PDN connection and bearer configuration of the traffic flow(s). Then, as described in the step S350, MeNB 250 may request the target access network and the original access network to provide, modify, or release radio resource for UE 210.

In an embodiment of the present disclosure, in response to receiving the traffic re-direct inform message from UE 210 (in the case of controlling network traffic from WLAN to SeNB), a SCG addition procedure would be performed by transmitting a SeNB addition request message for the traffic flow to SeNB 230 and receiving a SeNB addition request acknowledge message from SeNB 230 in response to the SeNE addition request message. The SeNB addition request message comprises a bearer configuration corresponding to the traffic flow indicator. The bearer configuration is generated according to the configuration of the traffic flow identified by the one or more traffic flow ID included in the traffic re-direct inform message or a default Evolved Packet System (EPS) bearer configuration. The SeNB addition request acknowledge message comprises a radio resource configuration of SeNB 230. If MeNB 250 endorses the radio resource configuration of SeNB 230, a RRC connection reconfiguration procedure with the new radio resource configuration would be performed with UE 210. MeNB 250 may transmit a radio resource reconfiguration message such as a RRC connection reconfiguration message in response to receiving the SeNB addition request acknowledge message, where the radio resource reconfiguration message comprises the radio resource configuration of SeNB 230. Then, MeNB 250 may receive a reconfiguration complete message from UE 210.

In another embodiment of the present disclosure, in response to receiving the traffic re-direct inform message from UE 210 or the traffic steering indication message from P-GW 293 via MME 291 (in the case of controlling network traffic from SeNB to WLAN), a SeNB modification procedure or a SeNB release procedure which is consistent with 3GPP TS 36.300 would be initiated according to the traffic flow indicator. If not all traffic flows via 3GPP access network such as from SeNB 230 are move to non-3GPP access network such as the WLAN of AP 270, the SeNB modification procedure would be performed. On the other hand, if all traffic flows via 3GPP access network are move to non-3GPP access network, the SeNB release procedure would be performed.

Then, MeNB 250 may update RAN assistance information to UE 210 to assist the 3GPP/WiFi interworking operation. The RAN assistance information updated from MeNB 250 to UE 210 may be generated by MeNB 250 with or without taking the RAN assistance information of SeNB 230 into account or, may be generated by SeNB 230.

In some embodiments of the present disclosure, MeNB 250 may request P-GW such as P-GW 293 to perform controlling the traffic flow(s). Specifically, in response to receiving the traffic re-direct inform message (in the case of controlling network traffic from WLAN to WLAN) or the SCG addition procedure being performed successfully (i.e., receiving the reconfiguration complete message) (in the case of controlling network traffic from WLAN to SeNB), MeNB 250 may transmit an evolved radio access bearer (E-RAB) modification indication message to MME 291, and receive an E-RAB modification confirmation message from MME 291 in response to the E-RAB modification indication message. The E-RAB modification indication message may comprise the information of the target access network, the traffic flow indicator, and the multi-connection indicator. Those parameters contained in the E-RAB modification indication message may be consisted with the parameters contained in the traffic re-direct inform message from UE 210. An E-RAB configuration contained in the E-RAB modification confirmation message may be modified in order to route the traffic flows to 3GPP access network, for example, provided by SeNB 230. Therefore, traffic flows can be routed from the P-GW 293 to SeNB 230 without traversing through the MeNB 250.

Furthermore, in an embodiment of present disclosure, MeNB 250 may receive a bearer modify request message, reconfigure radio bearer for the traffic flow in response to receiving the bearer modify request message, and continue a transmission of the traffic flow. In this case, PDN connection establishment over the target access network which is a non-3GPP access network is failed. P-GW such as P-GW 295 may initiate a P-GW initiated bearer modification procedure which is consisted with 3GPP TS 23.402 and 3GPP TS 23.401 to modify the bear configuration to route traffic to serving eNB of UE 210 such as MeNB 250 or SeNB 230. The bearer modify request message or a session management request would be transmitted from MME 291 to MeNB 250 or SeNB 230, and MeNB 250 or SeNB 230 would perform RRC connection reconfiguration procedure with UE 210. After the RRC connection reconfiguration procedure is completed, the traffic flow would be routed by MeNB 250 or SeNB 230.

Subsequently, in order to implement the aforementioned embodiments of the present disclosure in the communication system 200, several exemplary scenarios would be introduced. Those exemplary scenarios would be categorized according to the types of the original access network and the target access network, i.e., WLAN of AP 270 to SeNB 230, SeNB 230 to WLAN of AP 270, and WLAN of AP 270 to AP 275.

Figure 5:
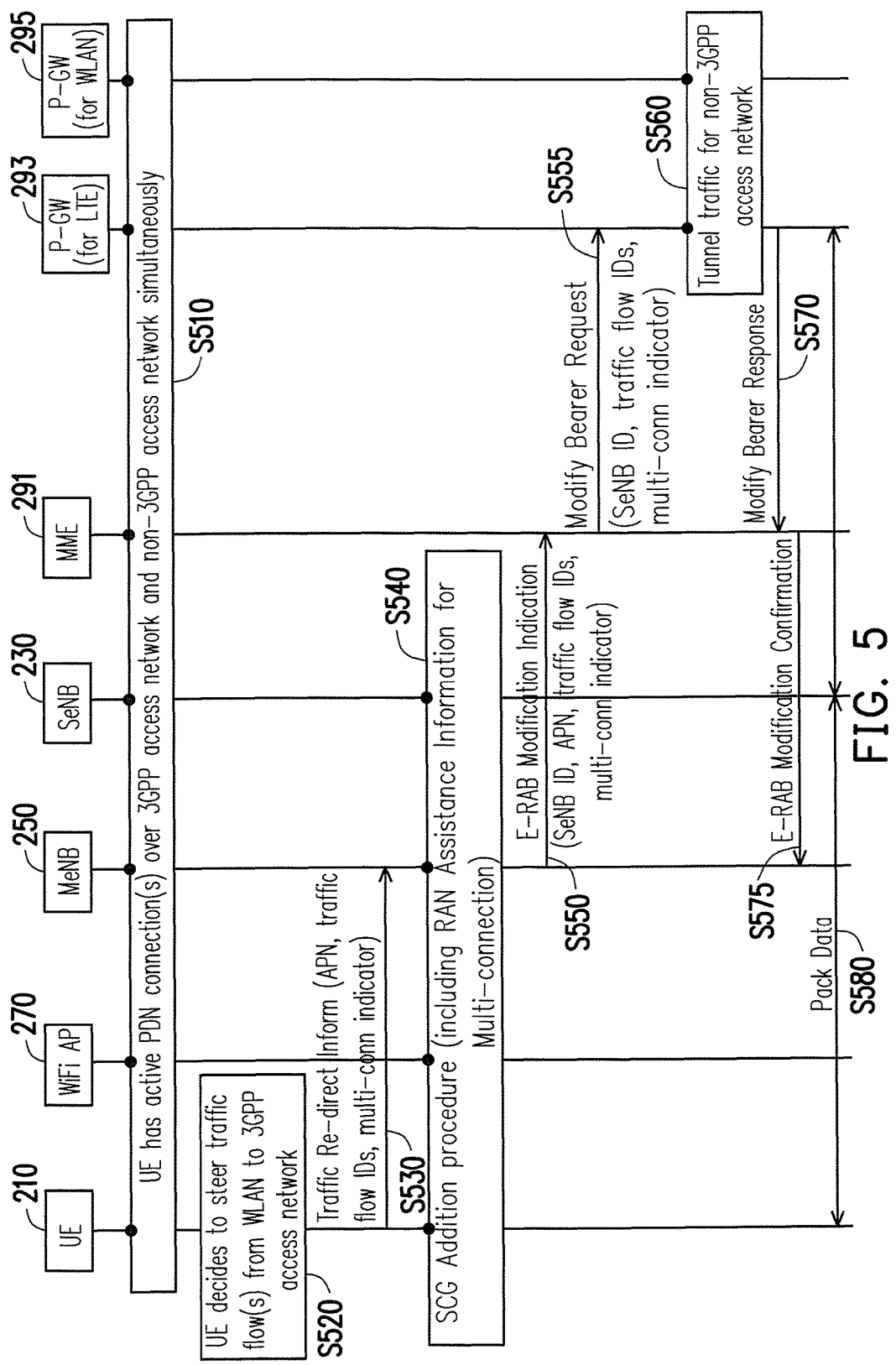
FIG. 5 illustrates a signaling mechanism used in the proposed method of controlling network traffic flow from WLAN to SeNB in accordance with one of the exemplary embodiments of the disclosure.

FIG. 5 illustrates a signaling mechanism used in the proposed method of controlling network traffic flow from WLAN to SeNB in accordance with one of the exemplary embodiments of the disclosure. It is assumed that UE 210 is moving from service coverage of AP 270 to SeNB 230 in this exemplary scenario. Referring to FIG. 5, UE 210 has one or more active PDN connection(s) over 3GPP and non-3GPP access networks simultaneously (step S510). UE 210 performs measurement procedure according to the configuration of the serving eNB (i.e., MeNB 250). It should be noticed that, the solid discs indicates the network elements involved in the procedure. For example, UE 210, AP 270, MeNB 250, MME 291, P-GW 293 and 295 are involved in the step S10. Then, UE 210 decides to steer one or more traffic flows from WLAN of AP 270 to 3GPP access network provided by MeNB 250 and SeNB 230, for example, according to the change of signal quality during UE 210 mobility (step S520). UE 210 sends a Traffic Re-direct Inform message to the serving eNB of the UE (i.e., MeNB 250). The Traffic Re-direct Inform message consists of the information of APN, one or more traffic flow ID, and a multi-com indicator to indicate that the UE supports multiple PDN connections over 3GPP and non-3GPP access networks simultaneously (step S530). When MeNB 250 receives the Traffic Re-direct Inform message from UE 210, MeNB 250 initiates SCG Addition procedure (which is consisted with 3GPP TS 36.300) to add SeNB 230 for UE 210 based on the measurement reports (step S540). After SCG Addition procedure, UE 210 has connections with MeNB 250 and SeNB 230 simultaneously for DC operation.

In the SCG Addition procedure, MeNB 250 send SeNB Addition Request message to SeNB 230 to allocate radio resource for the traffic flows to be steered to SeNB 230. MeNB 250 may generate parameters of the bearer configurations in the SeNB Addition Request message according to the configuration of the traffic flow(s) identified by the one or more traffic flow ID included in the Traffic Re-direct Inform message, or can adapt default EPS bearer configuration as the parameters needed for SCG Addition procedure. If SeNB 230 is able to admit the resource request, SeNB 230 would send SeNB Addition Request Acknowledge message to MeNB 250 with the SeNB 230's radio resource configuration and may also trigger Random Access procedure, so that a synchronisation of the SeNB 230's radio resource configuration can be performed.

If MeNB 250 endorsed the SeNB 230's radio resource configuration, MeNB 250 sends the RRC Connection Reconfiguration message to UE 210 including the new radio resource configuration. Then, UE 210 applies the new configuration and replies with RRC Connection Reconfiguration Complete message. Subsequently, MeNB 250 informs SeNB 230 that UE 210 has completed the reconfiguration procedure successfully.

MeNB 250 may update RAN assistance information to UE 210 to assist the 3GPP/WiFi interworking operation in dual connectivity situation. The RAN assistance information updated from MeNB 250 to UE 210 may be generated by MeNB 250 with taking the RAN assistance information of SeNB 230 into account or generated by SeNB 230.

After the SCG Addition procedure has been successfully performed, MeNB 250 sends an E-RAB Modification Indication message to the serving MME 291 of MeNB 250 to request for routing one or more traffic flows to the SeNB 230. The E-RAB Modification Indication message may consist of the information of SeNB ID (e.g., the ID of the SeNB 230), APN, one or more traffic flow ID, and a multi-conn indicator (step S550).

When MME 291 receives an E-RAB Modification Indication message from MeNB 250, MME 291 sends a Modify Bearer Request message to the P-GW 293 according to the APN in the E-RAB Modification Indication message to request the P-GW 293 to route one or more traffic flows to the SeNB 230. The E-RAB Modification Indication message may consist of the information of SeNB ID, one or more traffic flow ID, and a multi-conn indicator as carried by the E-RAB Modification Indication message (step S555).

When P-GW 293 receives a Modify Bearer Request message, P-GW 293 tunnels the one or more traffic flows for non-3GPP access network to 3GPP access network (step S560). If the one or more traffic flows for non-3GPP access network is served by a different P-GW such as P-GW 295, the procedure to tunnel traffic flows for non-3GPP access network to 3GPP access network involves both P-GW 293 and P-GW 295 according to the multi-conn indicator.

After P-GW 293 has successfully tunneled the one or more traffic flows for non-3GPP access network to 3GPP access network, the P-GW 293 sends a Modify Bearer Response message to MME 291 (step S570) which sent the Modify Bearer Request message to P-GW 293 to modify the bearer configuration. When MME 291 receive a Modify Bearer Response message from the P-GW 293, MME 291 sends an E-RAB Modification Confirmation message to MeNB 250 (step S575) to modify the E-RAB configuration in order to route the traffic flows to SeNB 230. Accordingly the traffic flows can be routed from P-GW 293 to SeNB 230 without traversing through the MeNB (step S580).

Figure 6:
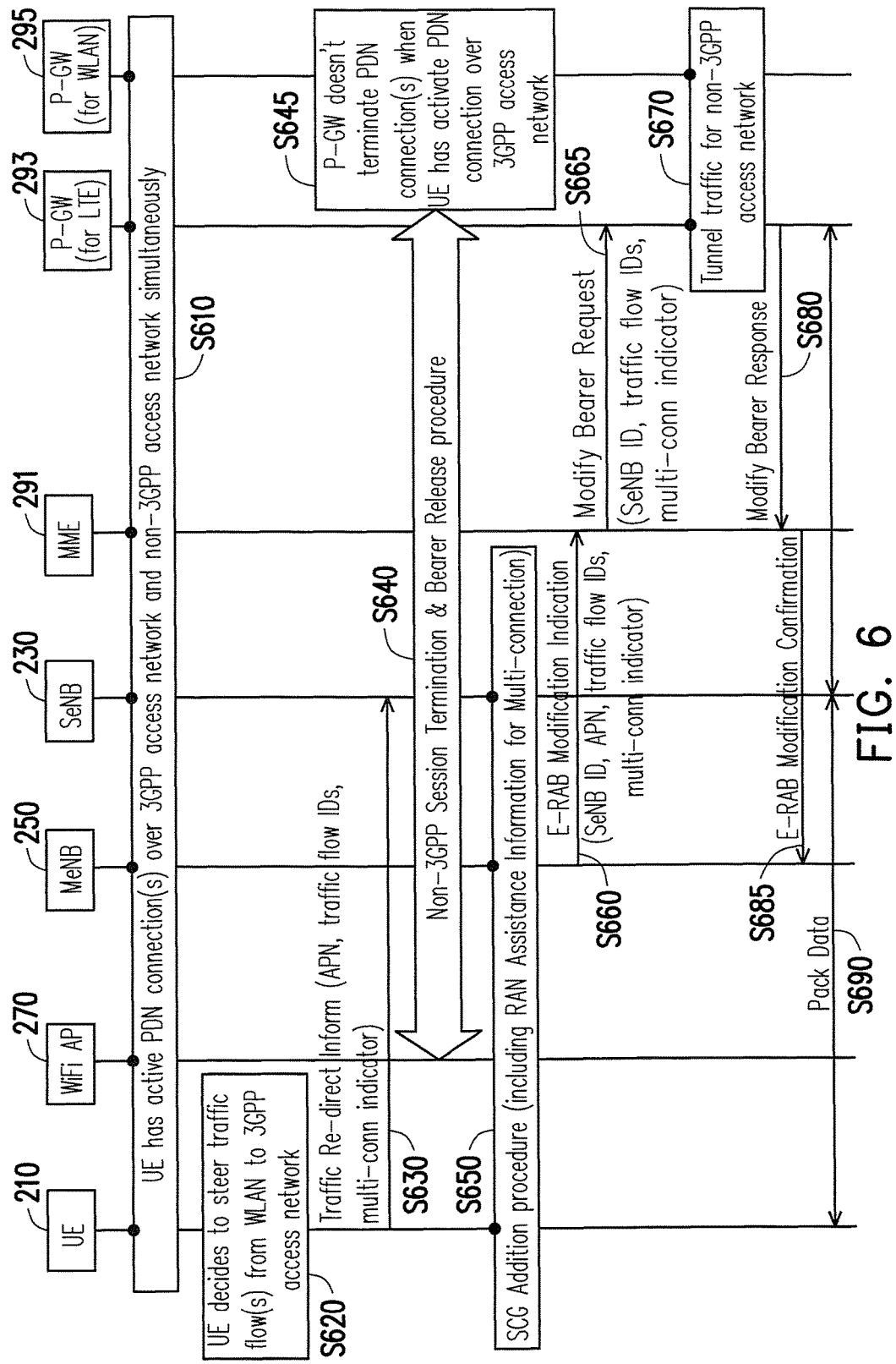
FIG. 6 illustrates another signaling mechanism used in the proposed method of controlling network traffic flow from WLAN to SeNB in accordance with one of the exemplary embodiments of the disclosure.

FIG. 6 illustrates another signaling mechanism used in the proposed method of controlling network traffic flow from WLAN to SeNB in accordance with one of the exemplary embodiments of the disclosure. Referring to FIG. 6, steps S610, S620, S630, S650, S660, S665, S670, S680, S685, and S690 may be referred to the description of the steps S510~S580 in FIG. 5, and thus the detailed description of those steps would not repeated. The difference between embodiments of FIG. 5 and FIG. 6 is, the PDN connection(s) over the WLAN of UE 210 provided by AP 270 are released before the success of traffic flow(s) tunneled from WLAN to 3GPP access network for UE 210 (step S640).

P-GW 295, which is the serving P-GW of UE 210 for the PDN connections over WLAN, doesn't terminate the PDN connection(s) of the UE via WLAN when UE 210 still has one or more activate PDN connection over 3GPP access network (step S645). If P-GW 295 for non-3GPP access network of UE 210 is different from the P-GW 293 for 3GPP access networks of UE 210, P-GW 295 for non-3GPP access network could be aware of that UE 210 has active PDN connection over 3GPP access network via the assist of other core network elements (e.g., 3GPP AAA server, HSS, the P-GW 293 for PDN connections over 3GPP access network of UE 210).

Figure 7:
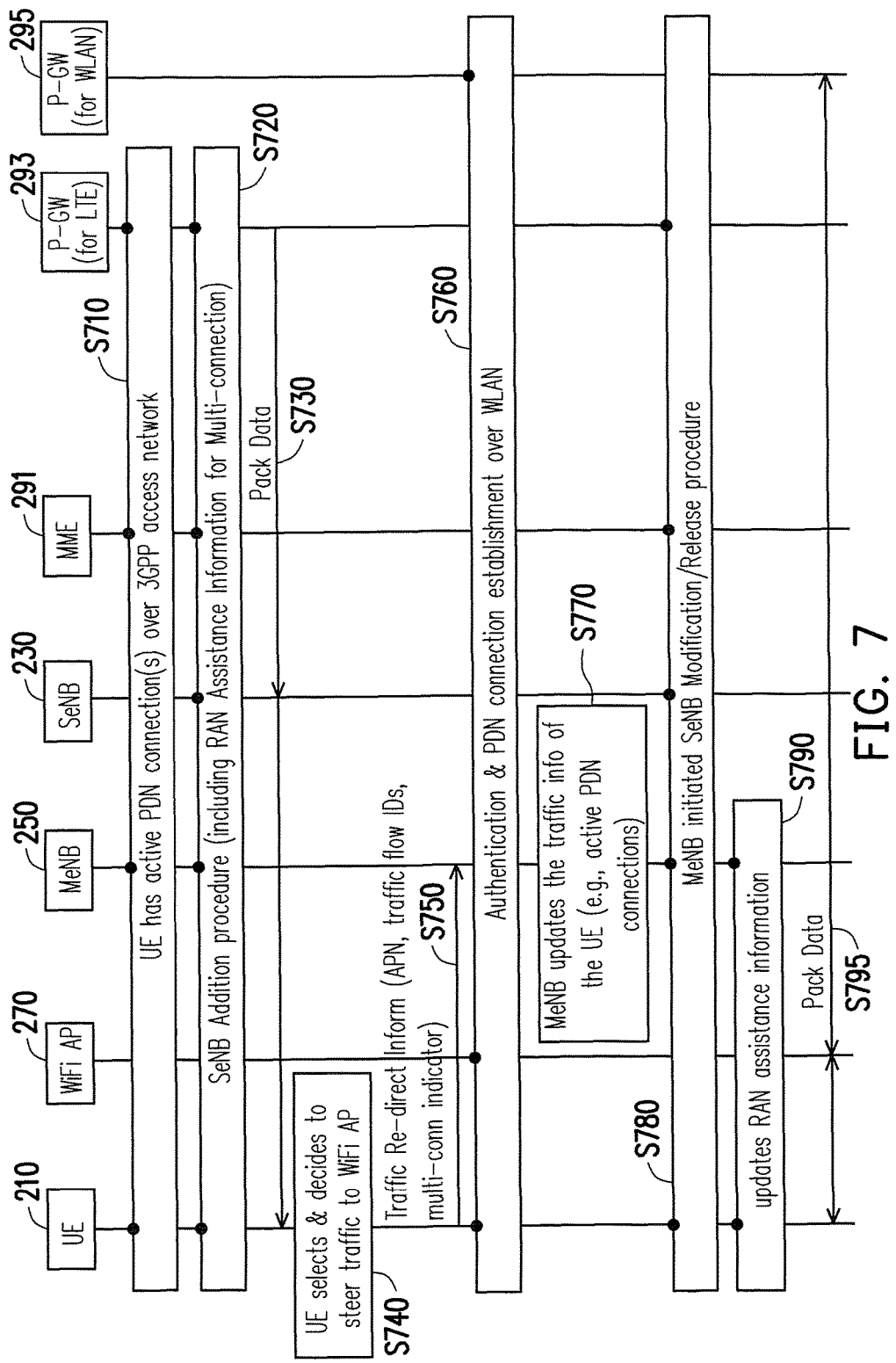
FIG. 7 illustrates a signaling mechanism used in the proposed method of controlling network traffic flow from SeNB to WLAN in accordance with one of the exemplary embodiments of the disclosure.

FIG. 7 illustrates a signaling mechanism used in the proposed method of controlling network traffic flow from SeNB to WLAN in accordance with one of the exemplary embodiments of the disclosure. It is assumed that UE 210 is moving from service coverage of SeNB 230 to AP 270 in this exemplary scenario. Referring to FIG. 7, UE 210 has one or more active PDN connection(s) over 3GPP network (step S710). UE 210 performs measurement procedure according to the configuration of the serving eNB (i.e., MeNB 250).

MeNB 250 decides to perform DC for UE 210 and initiates SeNB Addition procedure (which is consisted with 3GPP TS 36.300) to add SeNB 230 for UE 210 (step S720). After SeNB Addition procedure, UE 210 has connections with MeNB 250 and SeNB 230 simultaneously for DC operation. P-GW 293 routes one or more traffic flows to UE 210 via SeNB 230 without traversing through MeNB 250 (step S730). The SeNB Addition procedure here includes the SCG addition procedure and the path updated procedure. The path update procedure includes MeNB 250 sending E-RAB Modification Indication to MME 291, MME 291 sending Modify Bearer Request to P-GW 293, P-GW 293 sending Modify Bearer Response to MME 291, and MME 291 sending E-RAB Modification Confirmation to MeNB 250.

Then, UE 210 selects a WLAN provided by AP 270 and decides to steer one or more traffic flows from 3GPP access network to the WLAN (step S740), for example, according to the change of signal quality during UE 210 mobility. UE 210 sends a Traffic Re-direct Inform message to MeNB 250. The Traffic Re-direct Inform message consists of the information of APN, one or more traffic flow ID, and a multi-conn indicator to indicate that UE 210 supports multiple PDN connections over 3GPP and non-3GPP access networks simultaneously.

UE 210 establishes one or more PDN connections to the 3GPP core network via the selected WLAN. P-GW 295 for PDN connections over non-3GPP access network of UE 210 create context of UE 210. If P-GW 295 for non-3GPP access network of UE 210 is different from P-GW 293 for 3GPP access networks of UE 210, P-GW 293 and P-GW 295 could be aware of that UE 210 has active PDN connection over 3GPP and non-3GPP access networks simultaneously via the assist of other core network elements (e.g., 3GPP AAA server, HSS, P-GW 293 and 295 for PDN connections over 3GPP/non-3GPP access network of UE 210).

When MeNB 250 receives the Traffic Re-direct Inform message from UE 210 (step S750), MeNB 250 updates context of UE 210 including the information of the traffic flows of UE 210 (e.g., active PDN connections, bearer configuration) (step S770). Furthermore, an authentication and PDN connection establishment would be made over WLAN (step S760).

MeNB 250 initiates SeNB Modification procedure if not all traffic flows via SeNB 230 are moved to WLAN or SeNB Release procedure if all traffic flows via SeNB 230 are moved to WLAN (step S780). The detail of SeNB Modification procedure and SeNB Release procedure are consisted with 3GPP TS 36.300. MeNB 250 may update RAN assistance information to UE 210 to assist the 3GPP/WiFi interworking operation (when SeNB 230 is released) (step 790). The RAN assistance information updated from MeNB 250 to UE 210 may be generated by MeNB 250 without taking the RAN assistance information of SeNB 230 into account. Accordingly the traffic flows can be routed from P-GW 295 to AP 270 without (step S795).

Figure 8:
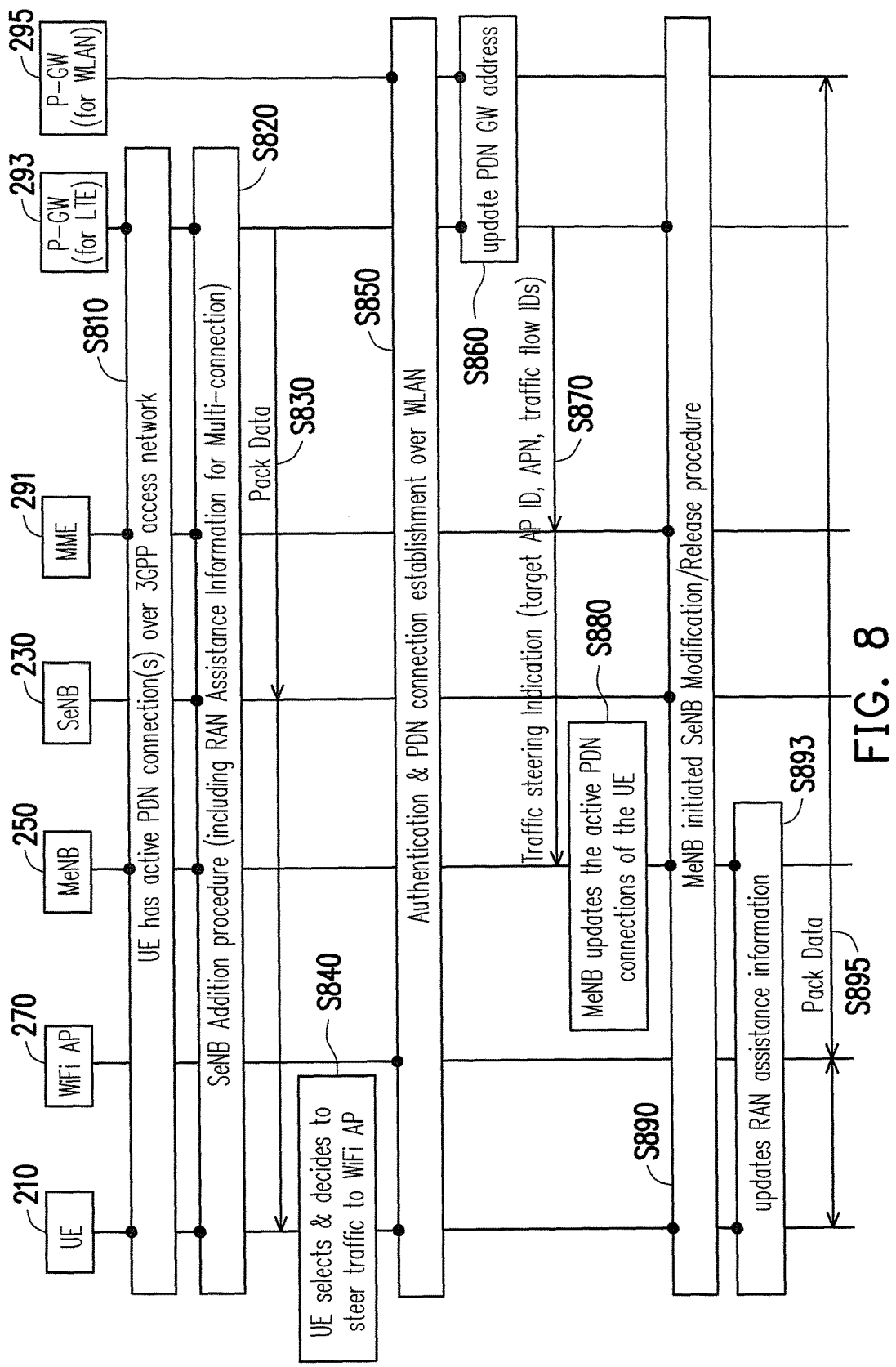
FIG. 8 illustrates another signaling mechanism used in the proposed method of controlling network traffic flow from SeNB to WLAN in accordance with one of the exemplary embodiments of the disclosure.

FIG. 8 illustrates another signaling mechanism used in the proposed method of controlling network traffic flow from SeNB to WLAN in accordance with one of the exemplary embodiments of the disclosure. Referring to FIG. 8, steps S810, S820, S830, S840, S850, S880, S890, S893, and S895 may be referred to the description of the steps S710~S740 and S760~S795 in FIG. 7, and thus the detailed description of those steps would not repeated. The difference between embodiments of FIG. 7 and FIG. 8 is the initiation of informing MeNB 250 which traffic flow(s) to be steered is made by P-GW 293 in FIG. 8. After authentication and PDN connection establishment, P-GW 293 and 295 may update PDN GW address (step S860). P-GW 293 for PDN connections over 3GPP access network of UE 210 sends a Traffic steering Indication message to the serving MME 291 of UE 210 (step S870). Then, the MME sends a Traffic steering Indication message to MeNB 250 (step S870). The Traffic steering Indication message consists of the information of Target AP ID, APN, one or more traffic flow ID to indicate that the UE has multiple PDN connections over 3GPP and non-3GPP access networks simultaneously.

Figure 9:
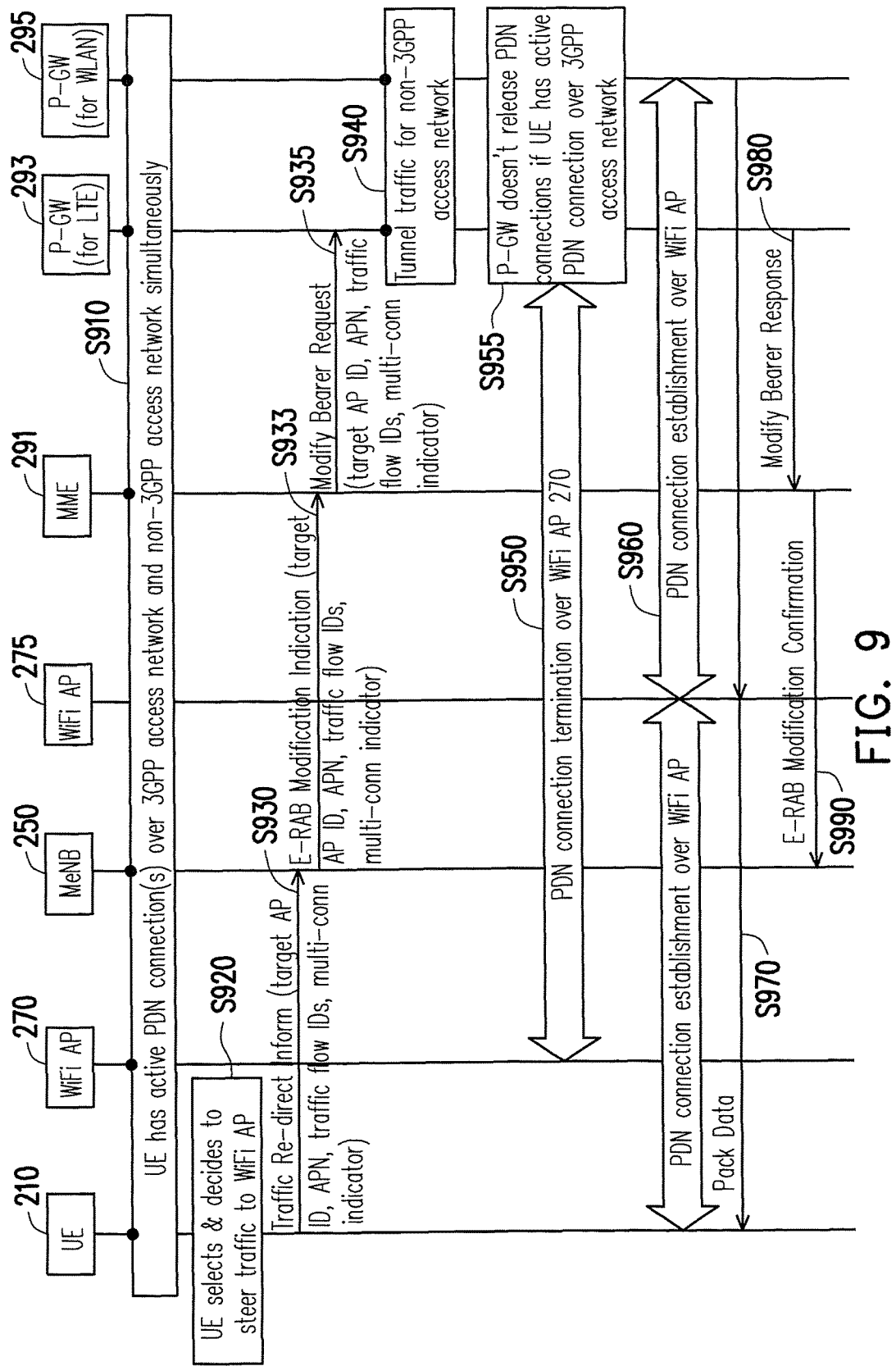
FIG. 9 illustrates a signaling mechanism used in the proposed method of controlling network traffic flow from WLAN to WLAN in accordance with one of the exemplary embodiments of the disclosure.

FIG. 9 illustrates a signaling mechanism used in the proposed method of controlling network traffic flow from WLAN to WLAN in accordance with one of the exemplary embodiments of the disclosure. Referring to FIG. 9, there is existed a WLAN provided by AP 275 in the communication system 200. It is assumed that UE 210 is moving from service coverage of AP 270 to AP 275 in this exemplary scenario. UE 210 has one or more active PDN connection(s) over 3GPP and non-3GPP access networks simultaneously (step S910). UE 210 performs measurement procedure according to the configuration of the serving eNB (i.e., eNB 250).

UE 210 selects WLAN of AP 275 and decides to steer one or more traffic flows of the active PDN connections to the AP 275 (step S920), for example, according to the change of signal quality during UE 210 mobility. The traffic flows that UE 210 decides to steer to AP 275 could be a part of the traffic flows of the PDN connections over the 3GPP access network, or could be a part of the traffic flows of the PDN connections over the non-3GPP access network (i.e., WLAN of AP 270).

UE 210 sends a Traffic Re-direct Inform message to the serving eNB of the UE (hereinafter be referred as MeNB 250 or eNB 250) (step S930). The Traffic Re-direct Inform message may consist of the information of target AP ID, APN, one or more traffic flow ID, and a multi-conn indicator to indicate that UE 210 supports multiple PDN connections over 3GPP and non-3GPP access networks simultaneously.

When eNB 250 receives the Traffic Re-direct Inform message from UE 210, eNB 250 sends an E-RAB Modification Indication message to the serving MME 291 of eNB 250 (step S933). The E-RAB Modification Indication message may consist of the information of target AP ID (e.g., the ID of AP 270), APN, one or more traffic flow ID, and a multi-conn indicator to indicate that UE 210 has multiple PDN connections over 3GPP and non-3GPP access networks simultaneously. When MME 291 receives an E-RAB Modification Indication message from eNB 250 (S933), MME 291 sends a Modify Bearer Request message to P-GW 293 (S935) to request P-GW 293 to tunnel one or more traffic flows to WLAN of AP 275 if needed. The E-RAB Modification Indication message may consist of the information of target AP ID (i.e., the ID of AP 275), APN, one or more traffic flow ID, and a multi-conn indicator as carried by the E-RAB Modification Indication message.

When P-GW 293 receives a Modify Bearer Request message, P-GW 293 tunnels the one or more traffic flows to non-3GPP access network if needed (step S940). If P-GW 295 for non-3GPP access network of UE 210 is different from the P-GW 293 for 3GPP access networks of UE 210, the procedure to tunnel traffic flows for non-3GPP access network to 3GPP access network involves both P-GW 293 and P-GW 295 according to the multi-conn indicator.

Before the PDN connection successfully established over WLAN of AP 275, if the P-GW 293, which is the serving P-GW of UE 210 for the PDN connections over WLAN of AP 270, receives the PDN connection termination request from WLAN of AP 270 to terminate the PDN connections over WLAN of AP 270, the P-GW 295 doesn't terminate the PDN connection(s) of UE 210 via WLAN of AP 270 when UE 210 still has one or more activate PDN connection over 3GPP access network (step S955). Otherwise, P-GW 293 terminates the PDN connections over WLAN of AP 270 (step S950).

If the P-GW 295 for non-3GPP access network of UE 210 is different from the P-GW 293 for 3GPP access networks of UE 210, P-GW 295 for non-3GPP access network could be aware of that UE 210 has active PDN connection over 3GPP access network via the assist of other core network elements (e.g., 3GPP AAA server, HSS, the P-GW 293 for PDN connections over 3GPP access network of UE 210).

UE 210 establishes one or more PDN connections to the 3GPP core network via the selected WLAN of AP 275 (step S960). The P-GW 295 for PDN connections over non-3GPP access network of UE 210 create or modify the context of UE 210 (step S275). When P-GW 293 receives a Modify Bearer Request message, P-GW 293 may tunnel the one or more traffic flows between 3GPP access network and non-3GPP access network if needed.

If P-GW 295 for non-3GPP access network of UE 210 is different from the P-GW 293 for 3GPP access networks of UE 210, the procedure to tunnel traffic flows between 3GPP access network and non-3GPP access network involves both P-GW 293 and P-GW 295 according to the multi-conn indicator. After P-GW 293 has successfully tunneled the one or more traffic flows between 3GPP and non-3GPP access networks, P-GW 293 sends a Modify Bearer Response message to MME 291 which sent the Modify Bearer Request message to P-GW 293 to modify the bearer configuration (step S980).

When MME 291 receives a Modify Bearer Response message from P-GW 293, MME 291 sends an E-RAB Modification Confirmation message to eNB 250 to modify the E-RAB (step S990). eNB 250 updates context of UE 210 including the information of the traffic flows of UE 210 (e.g., active PDN connections, access network type, bearer configuration).

Figure 10:
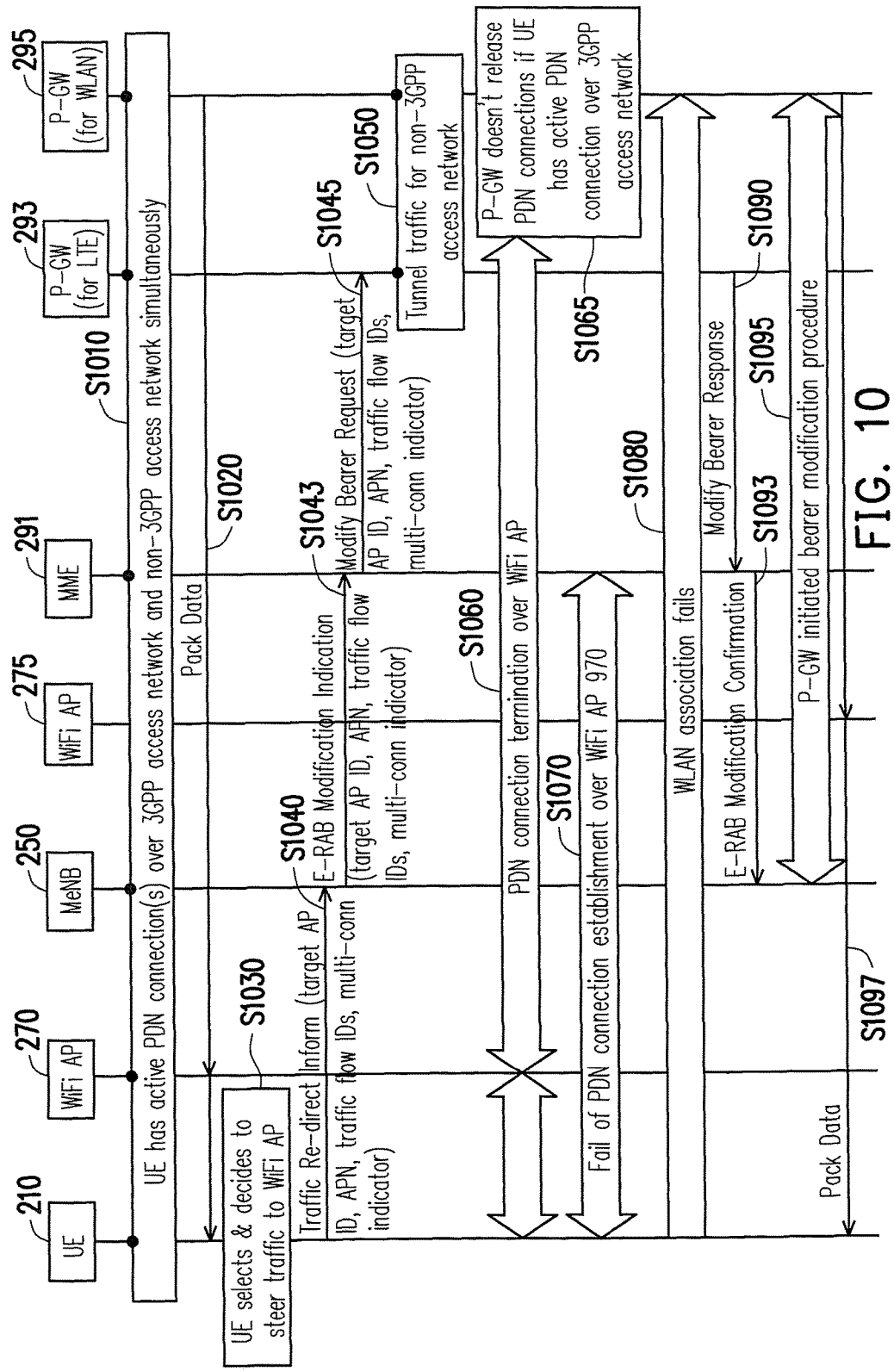
FIG. 10 illustrates another signaling mechanism used in the proposed method of controlling network traffic flow from WLAN to WLAN in accordance with one of the exemplary embodiments of the disclosure.

FIG. 10 illustrates another signaling mechanism used in the proposed method of controlling network traffic flow from WLAN to WLAN in accordance with one of the exemplary embodiments of the disclosure. Referring to FIG. 10, steps S1010, S1020, S1030, S1040, S1043, S1045, S1050, S1060, S1065, S1090, and S1093 may be referred to the description of the steps S910~S955 and S980~S990 in FIG. 9, and thus the detailed description of those steps would not repeated. The difference between embodiments of FIG. 9 and FIG. 10 is the PDN connection establishment over WLAN of AP 275 is failed (step S1070). In this case, UE 210 fails to establish PDN connection over WLAN of AP 275, UE 210 may inform the P-GW 295 for PDN connections over non-3GPP access network that WLAN of AP 275 association failed (step S1080).

If P-GW 295 for PDN connections over non-3GPP access network of UE 210 receives an inform of the fail of establishing PDN connection over WLAN of AP 275, or if the P-GW 295 run out of a pre-configured waiting time, P-GW 295 initiates the P-GW initiated bearer modification procedure (which is consisted with 3GPP TS 23.402 and 3GPP TS 23.401) to modify the bearer configuration to route traffic to eNB 250 (step S1095).

Figure 11:
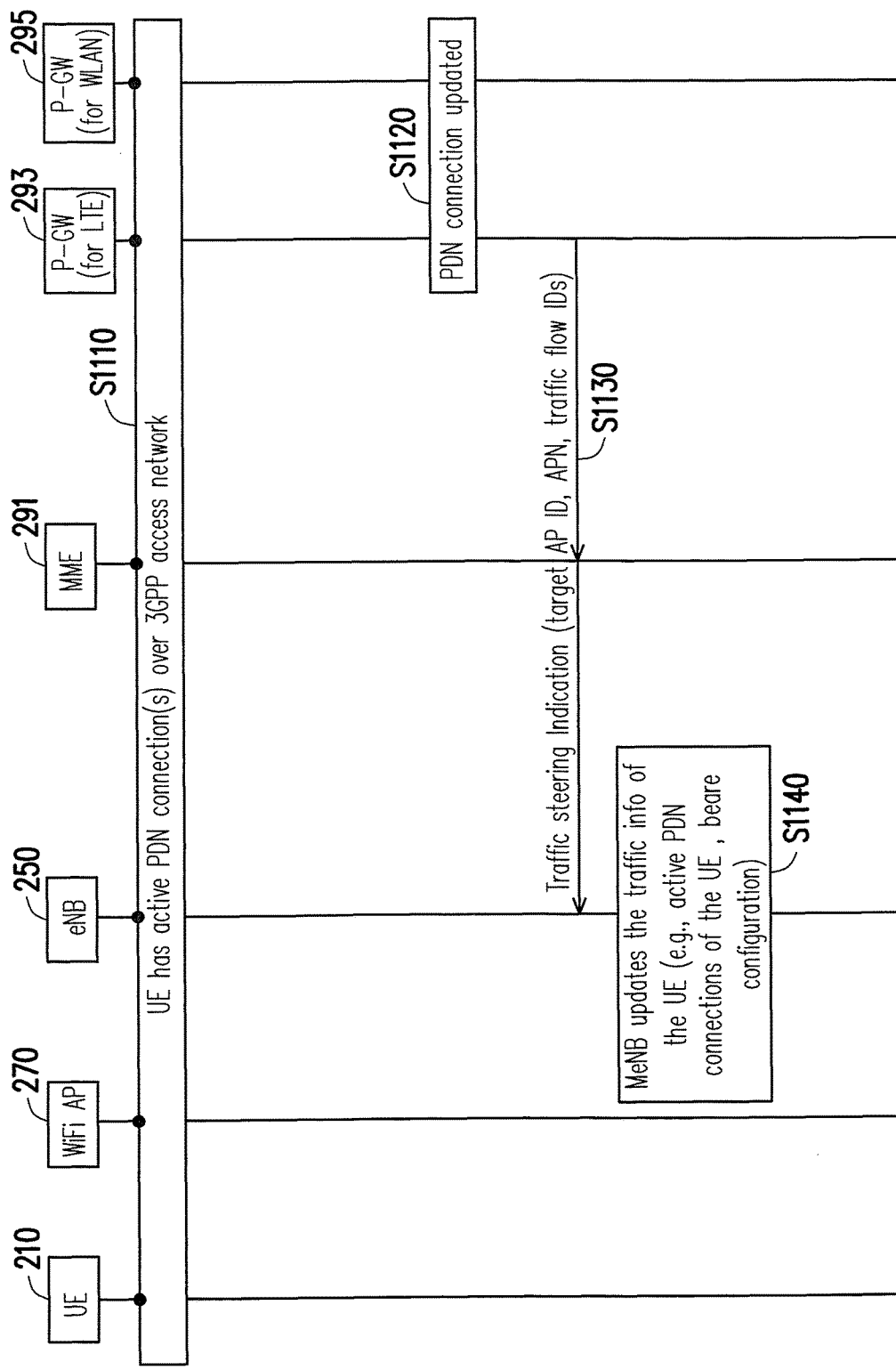
FIG. 11 illustrates another signaling mechanism used in the proposed method of controlling network traffic flow in accordance with one of the exemplary embodiments of the disclosure.

In still another embodiment of the present disclosure, P-GW 293 informs eNB 250 that traffic flow(s) over WLAN of AP 270 or 275 are updated. FIG. 11 illustrates another signaling mechanism used in the proposed method of controlling network traffic flow in accordance with one of the exemplary embodiments of the disclosure. Referring to FIG. 11, UE 210 has one or more active PDN connection(s) over 3GPP and non-3GPP access networks simultaneously (step S1110).

If P-GW 295 for non-3GPP access network of UE 210 is different from P-GW 295 for 3GPP access networks of UE 210, every time when the PDN connection over non-3GPP access network is updated in P-GW 295, and P-GW 293 and P-GW 295 are aware of that UE 210 has active PDN connection over 3GPP and non-3GPP access networks simultaneously via the assist of other core network elements (e.g., 3GPP AAA server, HSS, the P-GW 293 and 295 for PDN connections over 3GPP/non-3GPP access network of UE 210) (step S1120), P-GW 293 for the PDN connections over 3GPP access network of UE 210 sends a Traffic steering Indication message to the serving MME 291 of UE 210. Then, MME 291 sends a Traffic steering Indication message to the serving eNB of UE 210 (i.e., eNB 250) (step S1130). The Traffic steering Indication message consists of the information of Target AP ID, APN, one or more traffic flow ID.

When eNB 250 receives the Traffic steering Indication message, eNB 250 updates context of UE 210 including the information of the traffic flows of UE 210 (e.g., active PDN connections, bearer configuration) (step S1140).

The term "user equipment" (UE) such as UE 210 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 12:
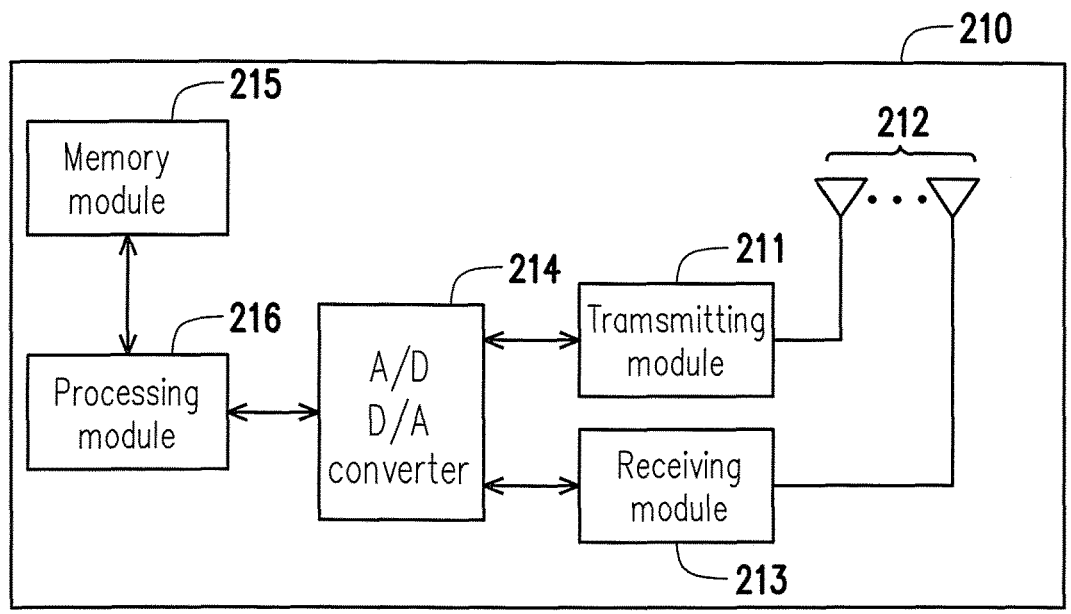
FIG. 12 is a block diagram which illustrates hardware components of a user equipment in terms of functional blocks in accordance with one of the exemplary embodiments of the disclosure.

A UE may be represented by at least the functional elements as illustrated in FIG. 12 in accordance with an embodiment of the present disclosure. UE 210 may contain at least but not limited to a transmitting module 211, a receiving module 213, an analog-to-digital (A/D)/digital-to-analog (D/A) converter 214, a processing module 216, optionally a memory module 215, and one or more antenna units 212. The transmitting module 211 transmits downlink signals wirelessly, and the receiving module 213 receives uplink signals wirelessly. The transmitting module 211 and the receiving module 213 may also perform operations such as low noise amplifying, impedance matching, frequency mixing, up or down frequency conversion, filtering, amplifying, and so like. The (A/D)/(D/A) converter 214 is configured to convert from an analog signal format to a digital signal format during uplink signal processing and from a digital signal format to an analog signal format during downlink signal processing. The processing module 216 is configured to process digital signal and to perform procedures of the proposed controlling network traffic method described in the aforementioned description in accordance with exemplary embodiments of the present disclosure. Also, the processing module 216 may optionally be coupled to a non-transitory memory module 215 to store programming codes, device configurations, a codebook, buffered or permanent data and so forth. The functions of the processing module 216 could be implemented by using programmable units such as a micro-processor, a micro-controller, a DSP chips, FPGA, etc. The functions of the processing module 216 may also be implemented with separate electronic devices or ICs, and the functions performed by the processing module 216 may be implemented within the domain of either hardware or software.

The term "base station" (BS) such as SeNB 230 and MeNB 250 in this disclosure could represent various embodiments which for example could include but not limited to a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

Figure 13:
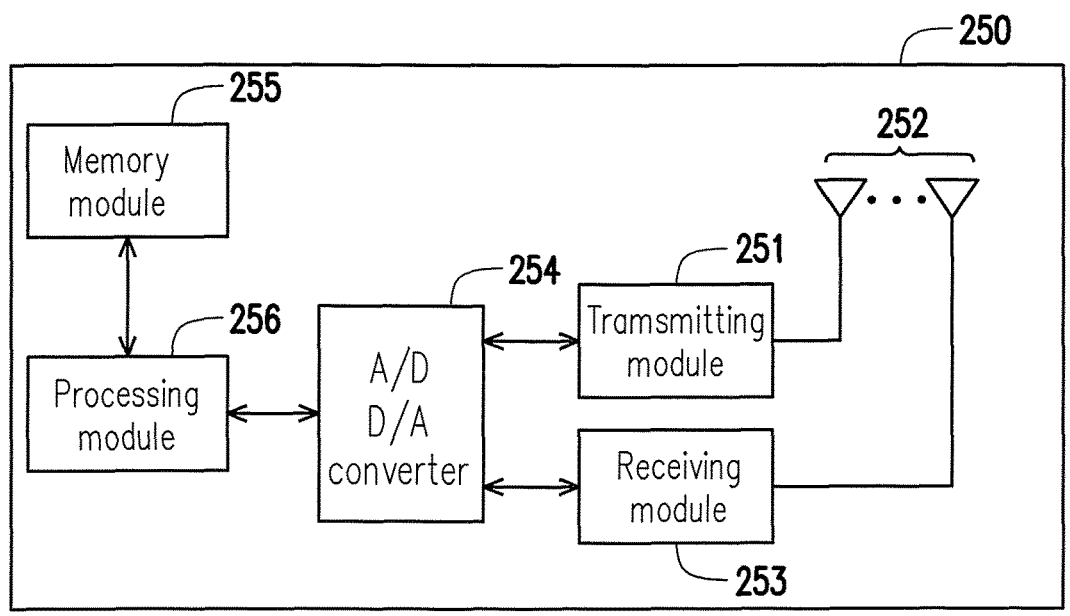
FIG. 13 is a block diagram which illustrates hardware components of a base station in terms of functional blocks in accordance with one of the exemplary embodiments of the disclosure.

A BS may be represented by at least the functional elements as illustrated in FIG. 13 in accordance with an embodiment of the present disclosure. MeNB 250 may contain at least but not limited to a transmitting module 251, a receiving module 253, an analog-to-digital (A/D)/digital-to-analog (D/A) converter 254, a processing module 256, optionally a memory module 255, and one or more antenna units 252. The transmitting module 251 transmits downlink signals wirelessly, and the receiving module 253 receives uplink signals wirelessly. The transmitting module 251 and the receiving module 253 may also perform operations such as low noise amplifying, impedance matching, frequency mixing, up or down frequency conversion, filtering, amplifying, and so like. The (A/D)/(D/A) converter 254 is configured to convert from an analog signal format to a digital signal format during uplink signal processing and from a digital signal format to an analog signal format during downlink signal processing. The processing module 256 is configured to process digital signal and to perform procedures of the proposed controlling network traffic method described in the aforementioned description in accordance with exemplary embodiments of the present disclosure. Also, the processing module 256 may optionally be coupled to a non-transitory memory module 255 to store programming codes, device configurations, a codebook, buffered or permanent data and so forth. The functions of the processing module 256 could be implemented by using programmable units such as a micro-processor, a micro-controller, a DSP chips, FPGA, etc. The functions of the processing module 256 may also be implemented with separate electronic devices or ICs, and the functions performed by the processing module 256 may be implemented within the domain of either hardware or software.

In view of the aforementioned descriptions, the present disclosure provides solutions to directly steer traffic flow between different assisted nodes (i.e., SeNB to WLAN, WLAN to SeNB, and WLAN to WLAN), so as to prevent service interruption. UE or P-GW may inform MeNB which traffic flow(s) would be steered and target access network. Then, the MeNB may request assisted access node to provide, modify, or release radio resource for the UE, and request the P-GW of 3GPP access network to perform controlling network of traffic flow(s). The P-GW may postpone the release of PDN connections over assisted access node of a UE if the UE has at least one active PDN connection established via 3GPP network.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero.

Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of controlling network traffic, used by a user equipment (UE) within a coverage of a base station (BS) in dual connectivity and in 3GPP/non-3GPP interworking, wherein there are a first assisted access node and a second assisted access node in the vicinity of the UE, the method comprising:
    determining whether to select a target access network of the second assisted access node; and
    transmitting a traffic re-direct inform message in response to the selection of the target access network to the BS, wherein the traffic re-direct inform message comprises information of the target access network and a traffic flow indicator corresponding to at least one traffic flow, to directly steer at least one traffic flow from the first assisted access node to the second assisted access network without traversing through the BS.

2. The method according to claim 1, wherein after the step of transmitting the traffic re-direct inform message to the BS, further comprising:
    establishing a connection over the target access network for continuing a transmission of the traffic flow.

3. The method according to claim 1, wherein the traffic flow indicator comprises at least one traffic flow identifier (ID), and before the step of transmitting the traffic re-direct inform message to the BS, further comprising:
    determining the traffic flow to be steered, wherein each of the traffic flow is corresponding to one of the traffic flow ID.

4. The method according to claim 1, wherein the traffic re-direct inform message further comprises a multi-connection indicator, and the multi-connection indicator indicates the UE support packet data network (PDN) connections over third generation partnership project (3GPP) and non-3GPP access networks simultaneously.

5. The method according to claim 1, wherein establishing the connection over the target access network for continuing the transmission of the traffic flow comprising:
    receiving radio access network (RAN) assistance information.

6. The method according to claim 1, wherein after the step of determining whether to select the target access network of the second assisted access node, further comprising:
    selecting the target access network according to the RAN assistance information.

7. The method according to claim 1, wherein the target access network is a non-3GPP access network, and step after determining whether to select the target access network of the second assisted access node, further comprising:
    establishing at least one PDN connection to a network entity to serve the UE via the non-3GPP access network.

8. The method according to claim 7, wherein the network entity is a Packet Data Network Gateway (P-GW).

9. The method according to claim 1, wherein transmitting the traffic re-direct inform message to the BS comprising:
    transmitting the traffic re-direct inform message to the BS over the 3GPP access network.

10. The method according to claim 1, wherein before the step of transmitting the traffic re-direct inform message to the BS, further comprising:
  establishing at least one PDN connection to a network entity.

11. The method according to claim 10, wherein the network entity is a P-GW.

12. The method according to claim 1, wherein the information of the target access network comprises at least one of information of Access Point Name (APN) and an AP ID.

13. A method of controlling network traffic, used by a base station (BS) which is in dual connectivity and 3GPP/non-3GPP interworking, the method comprising:
  receiving a traffic controlling message from a user equipment (UE) within a coverage of the BS, wherein there are a first assisted access node and a second assisted access node in the vicinity of the UE, the traffic controlling message comprises information of a target access network of the second assisted access node and a traffic flow indicator corresponding to at least one traffic flow; and
  requesting for controlling the traffic flow to the target access network in response to receiving the traffic controlling message, to directly steer the traffic flow from the first assisted access node to the second assisted access node without traversing through the BS.

14. The method according to claim 13, wherein the traffic controlling message further comprises a multi-connection indicator, and the multi-connection indicator indicates a UE support PDN connections over 3GPP and non-3GPP access networks simultaneously.

15. The method according to claim 13, wherein the controlling traffic message is a traffic re-direct inform message, and the step of receiving the traffic controlling message comprising:
  receiving the traffic re-direct inform message from a user equipment (UE) within a coverage of a base station (BS) in dual connectivity and in 3GPP/WiFi interworking.

16. The method according to claim 15, wherein requesting for controlling the traffic flow to the target access network comprising:
  transmitting a secondary eNB (SeNB) addition request message for the traffic flow in response to receiving the traffic re-direct inform message, wherein the SeNB addition request message comprises a bearer configuration corresponding to the traffic flow indicator;
  receiving a SeNB addition request acknowledge message in response to the SeNE addition request message, wherein the SeNB addition request acknowledge message comprises a radio resource configuration of the SeNB;
  transmitting a radio resource reconfiguration message to the UE in response to receiving the SeNB addition request acknowledge message, wherein the radio resource reconfiguration message comprises the radio resource configuration of the SeNB; and
  receiving a reconfiguration complete message from the UE.

17. The method according to claim 16, wherein after the step of receiving the reconfiguration complete message, further comprising:
  transmitting an evolved radio access bearer (E-RAB) modification indication message in response to receiving the reconfiguration complete message, wherein the E-RAB modification indication message comprises the information of the target access network, the traffic flow indicator, and the multi-connection indicator; and
  receiving an E-RAB modification confirmation message in response to the E-RAB modification indication message.

18. The method according to claim 13, further comprising:
  transmitting a RAN assistance information.

19. The method according to claim 15, wherein requesting for controlling the traffic flow to the target access network comprising:
  initiating a SeNB modification procedure or a SeNB release procedure according to the traffic flow indicator in response to receiving the traffic re-direct inform message.

20. The method according to claim 15, wherein requesting for controlling the traffic flow to the target access network comprising:
  transmitting an E-RAB modification indication message in response to receiving the traffic re-direct inform message, wherein the E-RAB modification indication message comprises the information of the target access network, the traffic flow indicator, and the multi-connection indicator; and
  receiving an E-RAB modification confirmation message in response to the E-RAB modification indication message.

21. The method according to claim 15, wherein after the step of receiving the traffic controlling message, further comprising:
  updating information of the traffic flow.

22. The method according to claim 21, the information of the traffic flow indicates at least one active PDN connection and a bearer configuration of a UE.

23. The method according to claim 15, further comprising:
  receiving a bearer modify request message;
  reconfiguring radio bearer for the traffic flow in response to receiving the bearer modify request message; and
  continuing a transmission of the traffic flow.

24. The method according to claim 13, wherein the traffic controlling message is a traffic steering indication message, and the step of receiving the traffic controlling message comprising:
  receiving the traffic steering indication message from network entities.

25. The method according to claim 24, wherein requesting for controlling the traffic flow to the target access network comprising:
  initiating a SeNB modification procedure or a SeNB release procedure according to the traffic flow indicator in response to receiving the traffic steering indication message.

26. The method according to claim 24, wherein the network entities comprises a P-GW and a mobility management entity (MME).

27. A user equipment (UE) within a coverage of a base station (BS) in dual connectivity and in 3GPP/non-3GPP interworking, wherein there are a first assisted access node and a second assisted access node in the vicinity of the UE, comprising:
  a transmitting module, transmitting wireless signal;
  a receiving module, receiving wireless signal; and
  a processor coupled to the transmitting module and the receiving module, and is configured at least for:
    determining whether to select a target access network of the second assisted access node; and transmitting, through the transmitting module, a traffic re-direct inform message to the BS in response to the selection of the target access network, wherein the traffic re-direct inform message comprises information of the target access network and a traffic flow indicator corresponding to at least one traffic flow, to directly steer at least one traffic flow from the first assisted access node to the second assisted access network without traversing through the BS.

* * * * *